United States Patent
Mew

[11] 3,893,605
[45] July 8, 1975

[54] FISH STRINGER
[76] Inventor: James T. Mew, Kings Lakeside Terr., Rt. 1, Viola, Mo. 65748
[22] Filed: Aug. 20, 1973
[21] Appl. No.: 383,619

[52] U.S. Cl. ................ 224/7 D; 403/344; 403/353
[51] Int. Cl. ................................................ A45f 3/00
[58] Field of Search ............ 224/7 D, 7 E; 403/313, 403/344, 353, 11; 24/115 R

[56] References Cited
UNITED STATES PATENTS
| | | | |
|---|---|---|---|
| 1,578,107 | 3/1926 | Tippit | 24/115 |
| 2,004,247 | 6/1935 | McCaul | 224/7 |
| 2,226,402 | 12/1940 | Hirschmann | 224/7 |
| 2,913,791 | 11/1959 | Martin | 403/11 |

Primary Examiner—Albert J. Makay
Assistant Examiner—Ross Weaver
Attorney, Agent, or Firm—Frederick W. Turnbull

[57] ABSTRACT

An improved fish stringer of a plastic covered flexible cable and a plurality of slide elements each carrying a swivel mounted hook to which a fish is to be secured. The cable having a portion of reduced diameter near one end and the slide having a narrow slot therein to provide for mounting and selective demounting of the slides from the cable.

1 Claim, 3 Drawing Figures

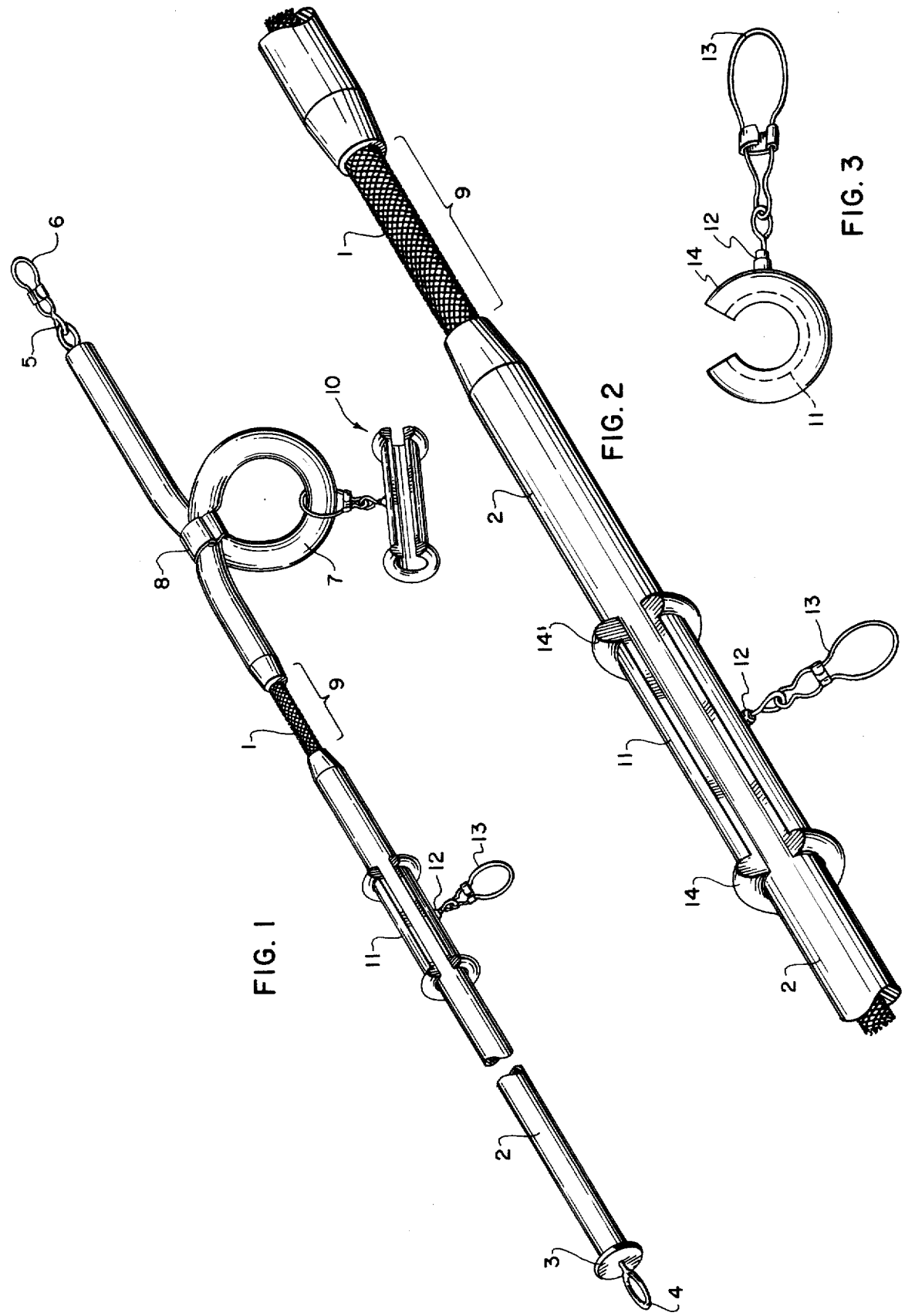

FISH STRINGER

Fish stringers are known in which a plurality of fish holding snap hooks may be successively positioned on a flexible element. These known fish stringers require the bitter end of the flexible element to be threaded through a sleeve on which each snap hook is mounted so that considerable time is expended in mounting each succesive spring hook on the flexible element, and moreover, the bitter end of the flexible element must be free so that it can pass through the sleeve.

This invention has for its object to provide a comparatively simple and inexpensive device of this character adapted to be suspended from the gunnel of a boat or other suitable support and by means of which the fish, as they are caught, may be successively positioned on the stringer without the necessity of untying the stringer or lifting the fish already strung thereon into a boat when it is desired to place an additional fish on said stringer.

A further object of the invention is to provide the device with a flexible stringer member having a plurality of individual snap hooks slidably mounted thereon adapted to receive the fish as they are caught and successively guide said fish along the stringer member to a position beneath the surface of the water.

A still further object of the invention is generally to improve this class of devices so as to increase their utility, durability and efficiency.

In the accompanying drawing forming a part of this specification and in which similar numerals of reference indicate corresponding parts in all the figures in the drawing:

FIG. 1 is a perspective view of the complete device,

FIG. 2 is an enlarged fragmentary view of the device of FIG. 1, and

FIG. 3 is an end view of a snap hook and its slide element.

The known stringers require many parts and many steps in their manufacture, thus making them expensive to provide while still retaining undesirable features.

Referring to FIG. 1, there is provided an elongated preferably wire flexible cable 1 over which is a relatively thick coating of a plastic or rubber-like material 2 bonded to the wire cable. At one end to be under water when the device is in use is a stop element 3 which may be merely a knob, or may be a washer-like element and the wire cable may be formed with a loop 4 below the stop element.

On the other end of the flexible element 1, 2 a swivel 5, and any suitable means 6 adapted to be fastened to a boat, or other suitable support, is permanently mounted. It will be noted that this end of the flexible element 1, 2 may be passed around a bush, tree of the like and the means 6 attached to the flexible element 1, 2 making the device very versatile in use.

A loop 7 is formed in the flexible element near the swivel 5, that may be secured by a metal clip or other conventional means 8. This loop is to be used to store unused swivels with their slide elements until required to hold a fish.

Near loop 7, between loop 7 and the stop 3, the plastic, rubber-like material 2 is substantially cut away at 9 providing a short length of flexible element of reduced diameter.

A plurality of swivel mounted snap hook and slide elements, as indicated generally at 10 in FIG. 1, and seen in more detail in FIGS. 2 and 3, are provided. Each of these assemblages comprise a split tubular element 11 having an internal diameter slightly greater than material 12, on which tubular element 11 a swivel 12 is mounted to carry a snap hook 13 by which a caught fish is to be secured. At each end of split tube 11 is a flange 14, 14' presenting a flaring opening leading from their circumferences to the slot in tube 11, which is only slightly wider than the diameter of flexible cable 1. It is preferred that swivel 12 be located at about 90° from the diameter of the tubular element 11 which includes the slot in tube 11 as providing the greatest ease in aligning the slot with the flexible element 1, 2. The slot in tubular element 11 can pass over flexible element 1 at position 9 where the cover 2 is not provided, but the tubular element, having been moved along the flexible element 1, 2 it cannot be removed as the diameter of element 2 is greater than the slot in element 11.

The flared openings in flanges 14, 14' will locate the flexible element 1, 2 opposite the slot in tubular slide 11 so that the sldie can be readily mounted on the flexible element 1, 2 by feel, the flexible element being placed in the flared openings and then the slide element 10 is slid along flexible element 1, 2 until the slot in element 11 reaches portion 9 of the flexible element, whereupon the flexible element 1 will pass into the interior of tubular element 11 and further movement will bring covering material 2 within the tubular element 11 and the slider 10 may be released and the slider with its fish will move by gravity along element 1, 2 until stopped by washer 2 which is immersed in water. It will be noted that the length of tubular element 11 may be longer than length 9 due to the flexibility of element 11.

The cover material 2 may be tapered toward portion 9 of flexible material 1 to facilitate sliding of the tubular element 11 along the element 1, 2.

It will, of course, be understood that the stringers may be made in different sizes and shapes and provided with any desired number of snap hooks without departing from the spirit of the invention.

The length of the fish stringer may be determined by the specific use to which it is to be put. Only a short length of flexible element 1, 2 will be required for use in fishing from a rowboat, whereas, a very long length may be needed if fishing from a bridge or pier. The length of tubular element 11 must be sufficient to avoid jambing as it slides down the length of element 1, 2.

Having thus described the invention, what is claimed as new is:

1. A fish stringer comprising a flexible cable of small diameter, a coating of flexible material adhered thereto to present an elongated flexible assemblage of relatively large diameter, means at one end of said flexible assemblage to secure it to a selected support, stop means at the other end, a plurality of snap hook and slider elements each of said snap hook and slider elements to successively receive a caught fish, said slider elements each comprising a slotted tubular element, the elongated flexible assemblage being reduced in diameter by the thickness of said coating to the diameter of said flexible cable for a short length near the means to secure it to a selected support, the width of the slot in said tubular element being approximately equal to the diameter of said flexible cable, and the inside diameter of said tubular element being such as to slide freely along said flexible assemblage, but of less diameter than said stop means, and a loop formed on said flexible assemblage between said means to secure it on a selected support and said short length of reduced diameter for removably carrying extra snap hook and slider elements.

* * * * *